(12) United States Patent
Arakawa et al.

(10) Patent No.: US 8,341,204 B2
(45) Date of Patent: *Dec. 25, 2012

(54) VECTOR SIMD PROCESSOR

(75) Inventors: Fumio Arakawa, Kodaira (JP); Tetsuya Yamada, Kawasaki (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 793 days.

This patent is subject to a terminal disclaimer.

(21) Appl. No.: 12/497,208

(22) Filed: Jul. 2, 2009

(65) Prior Publication Data

US 2009/0271591 A1     Oct. 29, 2009

Related U.S. Application Data

(63) Continuation of application No. 11/212,736, filed on Aug. 29, 2005, now Pat. No. 7,567,996, which is a continuation of application No. 09/800,507, filed on Mar. 8, 2001, now Pat. No. 7,028,066.

(51) Int. Cl.
*G06F 7/38* (2006.01)

(52) U.S. Cl. ........................................ 708/514; 712/222

(58) Field of Classification Search .................. 708/514, 708/524, 709
See application file for complete search history.

(56) References Cited

U.S. PATENT DOCUMENTS

| | | | |
|---|---|---|---|
| 3,299,261 A | 1/1967 | Steigerwalt, Jr. | |
| 5,218,709 A | 6/1993 | Fijany et al. | |
| 6,005,590 A | 12/1999 | Negishi et al. | |
| 6,038,582 A | 3/2000 | Arakawa et al. | |
| 6,115,812 A | 9/2000 | Abdallah et al. | |
| 6,292,886 B1 | 9/2001 | Makineni et al. | |
| 6,321,327 B1 | 11/2001 | Makineni et al. | |
| 6,418,529 B1 | 7/2002 | Roussel | |
| 6,430,589 B1 | 8/2002 | Jennings, III | |
| 6,502,089 B1 | 12/2002 | Amundsen et al. | |
| 6,578,063 B1 | 6/2003 | Kojima et al. | |
| 6,754,684 B1 | 6/2004 | Kotlov | |

FOREIGN PATENT DOCUMENTS

JP     07-210545 A     8/1995
(Continued)

OTHER PUBLICATIONS

Diefendorff, Keith, "Sony's Emotionally Charged Chip", *Microprocessor Report*, vol. 13, No. 5, Apr. 19, 1999, pp. 1, 6-11.

(Continued)

*Primary Examiner* — Tan V. Mai
(74) *Attorney, Agent, or Firm* — Miles and Stockbridge P.C.

(57) ABSTRACT

A data processor whose level of operation parallelism is enhanced by composing floating-point inner product execution units to be compatible with single instruction multiple data (SIMD) and thereby enhancing the operation processing capability is made possible. An operating system that can significantly enhance the level of operation parallelism per instruction while maintaining the efficiency of the floating-point length-4 vector inner product execution units is to be implemented. The floating-point length-4 vector inner product execution units are defined in the minimum width (32 bits for single precision) even where an extensive operating system becomes available, and compose the inner product execution units to be compatible with SIMD. The mutually augmenting effects of the inner product execution units and SIMD-compatible composition enhances the level of operation parallelism dramatically. Composition of the floating-point length-4 vector inner product execution units to calculate the sum of the inner product of length-4 vectors and scalar to be compatible with SIMD of four in parallel results in a processing capability of 32 FLOPS per cycle.

5 Claims, 12 Drawing Sheets

FOREIGN PATENT DOCUMENTS

| | | |
|---|---|---|
| JP | 9-265543 A | 10/1997 |
| JP | 10-124484 A | 5/1998 |
| JP | 11-296498 A | 10/1999 |

OTHER PUBLICATIONS

Arakawa et al., "SH4 Risc Multimedia Microprocessor", *IEEE Micro*, vol. 18, No. 2, Mar./Apr. 1998, pp. 26-34.

VECTOR SIMD PROCESSOR

CROSS-REFERENCE TO RELATED APPLICATION

This application is a continuation of application Ser. No. 11/212,736 filed Aug. 29, 2005, now U.S. Pat. No. 7,567,996 which is a continuation of application Ser. No. 09/800,507 filed Mar. 8, 2001 now U.S. Pat. No. 7,028,066.

FIELD OF THE INVENTION

The present invention relates to a data processor for, processing data, such as a microprocessor, and further to a technique for efficiently enhancing the level of operation parallelism when applied to a data processing system suitable for three dimensional graphic control.

BACKGROUND OF THE INVENTION

As a data processor for performing three dimensional graphic processing, MICROPROCESSOR REPORT, vol. 13, no. 5, Apr. 19, 1999, pp. 1, 6-11 discloses a processor having two single instruction multiple data (SIMD) type floating-point units which execute four floating-point multiply-add operations at one instruction. The processor disclosed therein can execute two operations, comprising a multiplication and an addition, in one floating-point multiply-add operation, four operations in two floating-point multiply-add operations, or a total of 16 operations with the two units. As the processor also has two conventional floating-point multiply-add execution units in addition to the aforementioned two units, it can perform four additional operations, or a total of 20 operations in a single cycle.

Other such data processors include one disclosed in IEEE Micro., vol. 18, no- 2, March/April 1998, pp. 26-34, which, having instructions to calculate floating-point inner products, can calculate two length-4 vector inner products by executing four multiplications and three additions at one instruction. It performs seven operations in one cycle when executing an instruction to calculate inner products.

Further, the Japanese Published Unexamined Patent Application No. Hei 10-124484 discloses a data processor which can calculate inner products by providing eight floating-point numbers to four multipliers and adding in parallel the results of multiplication with four input adders, i.e. in one round of parallel multiplications and additions.

The present inventor made a study on data processors and data processing systems which could accomplish graphic processing using floating-point numbers in multimedia equipment faster than conventional processors or systems.

Particularly important and heavy-load modes of processing for a data processor for use with multimedia equipment and a data processing system for multimedia processing are three dimensional graphic processing and image processing of these modes, image processing is standardized, and therefore the method involving the least manufacturing cost is mounting of dedicated hardware. There are already available conventional processors mounted with dedicated hardware for image processing.

On the other hand, three dimensional graphic processing requires geometric processing such as coordinate transformation and rendering such as color scheming. Since rendering is not suitable for a general purpose processor but is usually processed in formatted processing, it is a common practice to use dedicated hardware where fast processing is required. By contrast, for geometric processing such as coordinate transformation, which has greater freedom and handles floating-point data, is usually carried out by floating-point units of the processor. The most frequent mode of geometric processing is length-4 vector inner product operation. Intensity calculation is processed by calculating the inner product; coordinate transformation, by calculating the product of a 4×4 matrix and a length-4 vector; and transformation matrix generation, by calculating the product of 4×4 matrices. These modes of processing can be accomplished by one length-4 vector inner product operation for intensity calculation, four length-4 vector inner product operations for coordinate transformation, and 16 length-4 vector inner product operations for transformation matrix generation There also are conventional processors specialized in length-4 vector inner product operations to achieve faster processing, resulting in an efficient speed increase in geometric processing.

However, there is a stringent requirement for higher speed in three dimensional graphic processing, and a further increase in processing speed is needed to increase the reality of moving pictures. Yet, since basic data of graphic processing are length-4 vectors, it is difficult for any conventional processor arrangement to further raise the level of parallelism. There are many applications whose processing speed can be enhanced by defining a hypercomplex vector inner product instruction, such as finite impulse response (FIR), but what requires the highest floating-point operation performance in the field of consumer multimedia is three dimensional graphic processing. Even if a known processor having a length-4 vector instruction can efficiently enhance the level of parallelism, it will be meaningless unless it contributes to increasing the speed of three dimensional graphic processing.

On the other hand, as a matter of principle, it is easy to enhance the level of parallelism with the SIMD system. However, the SIMD system also has inefficient aspects, and its cost tends to significantly increase with a rise in the level of parallelism. It cannot be considered a realistic solution to further expand the SIMD part by several times. which already occupies a large area in a conventionally available processor. For instance, the data processor disclosed in the first reference cited as an example of the prior art has as many as 10 floating-point multiply-add execution units built into it, and its chip area would amount to a huge area of 240 square millimeters even if produced in a 0.25 μm process. Out of this total chip area, the area of the parallel SIMD type floating-point unit to execute four floating-point multiply-add operations is estimated at about 22 square millimeters from the chip photograph Since dividers are not fully formed in a parallel SIMD configuration and not quite as many as four control circuits are necessarily needed, the required area will be about three times as large as that of a usual floating-point unit.

The chip area of the data processor disclosed in the second reference cited as another example of the prior art will be about 56 square millimeters if produced in a 0.25 μm process. Out of this total chip area, the area of the floating-point unit is estimated at about 10 square millimeters from the chip photograph, and the area excluding the unit for executing the inner product instruction is about 7.5 square millimeters. This means that the addition of the inner product instruction results in a floating-point unit increased by about 1.3 times.

An object of the present invention is to provide a data processor and a data processing system efficiently improved in the level of operation parallelism.

Another object of the invention is to provide a data processor and a data processing system which are minimized in circuit dimensions and yet capable of floating-point number operations highly accurately and at high speed.

SUMMARY OF THE INVENTION

Out of the aspects of the invention disclosed by this application, typical ones are summarized below.

Thus, a data processor has an SIMD type execution unit configured inside to enhance the capacity of processing floating-point numbers, and has a single instruction for causing the SIMD type execution unit to process vector data. Another data processor has an SIMD type execution unit configured inside to enhance the capacity of processing floating-point numbers, and an instruction for causing the SIMD type execution unit to process vector data is included in an instruction set. Further, the SIMD type execution unit has a plurality of execution units for performing multiply-add operations on floating-point numbers.

The instruction set of the data processor includes an instruction to cause the data processor to add the inner product of vector data and scalar data. This instruction enables the data processor to calculate at a single instruction, the inner product of a length-4 vector and another length-4 vector and the sum of the product and the scalar data. For the execution of these operations, the data processor has the floating-point execution unit, which may as well be an SIMD type execution unit to enhance the processing capacity.

The execution unit or the floating-point execution unit constituting the SIMD type execution unit has a multi-input adder for high speed calculation of the sum of the inner product of vectors and the scalar data. In a data processor specializing in length-4 vector processing, which is frequently used in three dimensional graphic processing, for fast accomplishment of three dimensional graphic processing, the execution unit has a 9 input adder.

Further, the instruction set of the data processor causes the data processor to calculate the product of matrix data and vector data at a single instruction. This instruction enables the data processor to calculate a 4×4 matrix and a length-4 vector at a single instruction. To process the instruction, the data processor has a plurality of floating-point execution units for calculating the inner product of one set of vector data and another It is thereby made possible to accomplish calculation using a 4×4 matrix and a length-4 vector, which is frequently used in three dimensional graphic processing, at high speed. Each of the floating-point execution units can also add an inner product and scalar data. Incidentally, the execution unit has a multi-input adder.

BRIEF DESCRIPTION OF THE DRAWINGS

The above-described and other objects, advantages and novel features of the present invention will become more apparent from the following description in this specification when taken in conjunction with the accompanying drawings, wherein.

DETAILED DESCRIPTION OF THE PREFERRED EMBODIMENTS

Figure 1:
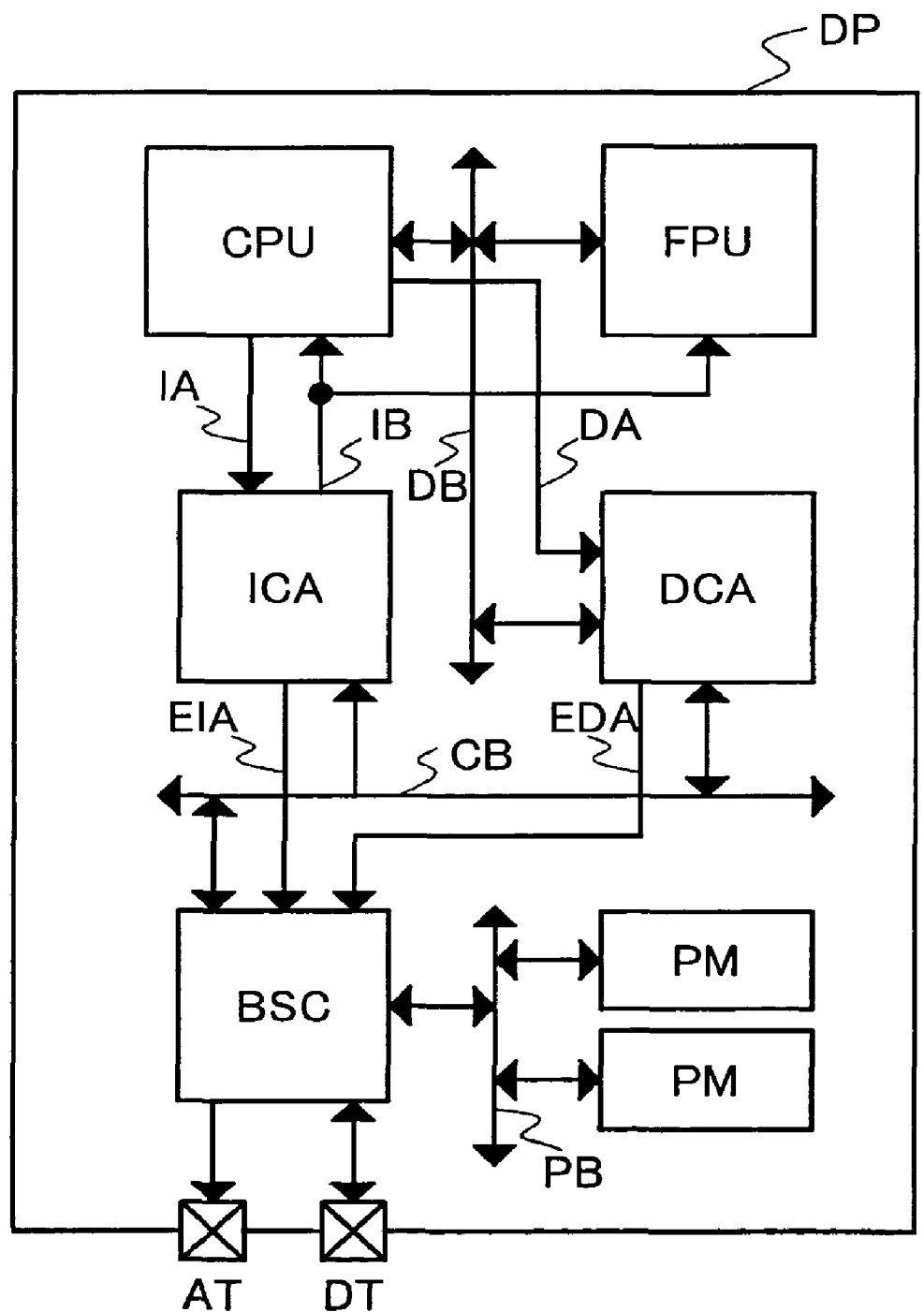
FIG. 1 illustrates the configuration of a processor to which the invention is applied.

FIG. 1 illustrates the configuration of a data processor DP to which the present invention is applied. The data processor DP so embodying the invention has a central processing unit CPU as an integer unit having a capability to process integers, a single instruction multiple data floating-point unit (SIMD type floating-point unit) FPU for calculating floating-point numbers, an instruction cache ICA, a data cache DCA, a bus controller BSC, a plurality of peripheral modules PM, an address pin AT, a data pin DT among other elements. The central processing unit CPU and the SIMD type floating-point unit FPU are connected to the instruction cache ICA via the instruction bus IB, and take in an instruction from the instruction cache. An address for designating the instruction to be taken in by the central processing unit and the SIMD type floating-point unit is given from the central processing unit via an instruction address bus IA. The central processing unit, the SIMD type floating-point unit and the data cache DCA are connected to the data bus DB. A data address is supplied to the data cache from the central processing unit via a data address bus DA. The instruction cache ICA and the data cache DCA have cache controllers, whose illustration is dispensed with here. The instruction cache and the data cache are connected to the bus controller BSC via a cache bus CB, over which data signals and control signals are also communicated. In the event of erroneous caching or the like in the instruction cache, an instruction address for external access is provided to the bus controller via an external access instruction address bus EIA. Or in the event of erroneous caching or the like in the data cache, a data address for external access is provided to the bus controller via an external address data address bus EDA. The bus controller actuates an external bus cycle to access an external memory or the like, connected via the address terminal AT and the data terminal DT, in accordance with the instruction address or data address delivered from the cache. After that, the bus controller supplies the instruction or the data, having arrived from the external memory or the like at the data terminal, to the instruction cache or the data cache via the cache bus CB. To the bus controller is connected via a peripheral bus PB a peripheral circuit PM, which may be, but not limited to, a timer or a serial communication interface controller. To add, the data processor, which is this embodiment, is formed over a single semi-conductor wafer, whose material may be, but not limited to, monocrystalline silicon. The data processor, which is this embodiment, has a reduced instruction set computer (RISC), though it is not limited to this architecture, and its instruction set includes a floating-point instruction. The floating-point instruction may be 16 bits long to enhance the memory efficiency or 32 bits long to be compatible with an increased number of instructions, but its length is not limited to these.

By incorporating the data processor so embodying the invention into multimedia equipment, e.g. a video game machine, it is made possible to implement a data processing system fully supporting three dimensional graphics.

Next will be described in detail. the data processor DP illustrated in FIG. 1. In the data processor in this embodiment, the SIMD type floating-point unit FPU has no memory addressing capability so as to save the area it occupies. In other words, the central processing unit CPU, instead of the SIMD type floating-point unit, has a memory addressing function. For this reason, the central processing unit not only fetches data from the memory for the SIMD type floating-point unit but also all the instructions including the floating-point instruction for the SIMD type floating-point unit from the memory. The instructions fetched by the central processing unit are taken in by both the central processing unit and the SIMD type floating-point unit via the instruction bus IB and decoded. The central processing unit, if the decoded instruction is a CPU instruction, executes integer processing in accordance with the decoded instruction or, if the decoded instruction is a floating-point instruction, executes addressing processing or the like on behalf of the SIMD type floating-point unit. The SIMD type floating-point unit, if the decoded instruction is a CPU instruction, ignores the instruction or, if the decoded instruction is a floating-point instruction, carries out floating-point calculation in accordance with the decoded instruction. Here, if the decoded instruction is either a load or store instruction, the central processing unit outputs the data address to the data cache to request loading or storage of data. In response to that request, the data cache DCA loads the data of the inputted data address onto the data bus DB or stores them from the data bus as the case may be. Incidentally, even where the data are to be stored, the external address of a usual copy-back cache is for reading, and the storage is done onto part of a cache line cached by the reading, though if the cache line is replaced with an effective and updated one at the time of caching, the cache line is externally copied back. If the register for which the load or store instruction is destined is a register of the SIMD type floating-point unit, the SIMD type floating-point unit, if the instruction is to load, writes the value on the data bus into the register of the SIMD type floating-point unit or if the instruction is to store, outputs the value of the register in the SIMD type floating-point unit onto the data bus. Incidentally, loading and storage by the SIMD type floating-point unit will be described with reference to FIG. 3.

Figure 2:
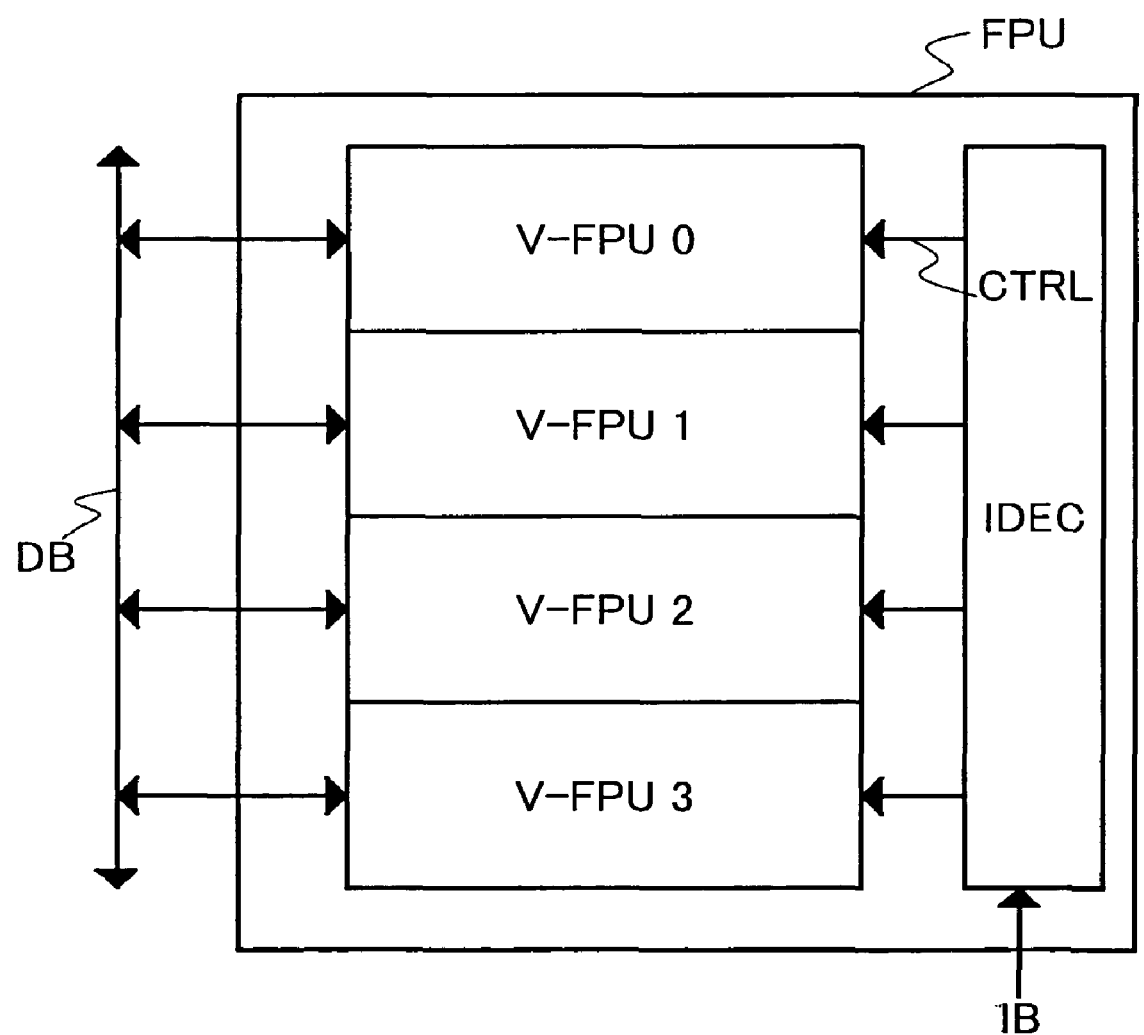
FIG. 2 illustrates the configuration of an SIMD floating-point unit (SIMD-FPU) of the processor to which the invention is applied.

FIG. 2 illustrates the configuration of the SIMD floating-point unit FPU of the data processor shown in FIG. 1. An instruction decoder IDEC in FIG. 2 decodes an instruction supplied from the instruction bus IB, generates a control signal CTRL on the basis of the result of decoding. and controls four vector floating-point units V-FPU. Each vector floating-point unit V-FPU is connected to the data bus DB via a bus having a width of 128 bits. Each floating-point unit processes load/store and floating-point calculation in accordance with the control signal CTRL. The width of the data bus DB may be 128 bits, 256 bits or 512 bits. If it is 512 bits, the quantity of wiring will increase, but the control is simplified because each vector floating-point unit can have a dedicated 128 bit bus. However, effective utilization of a data bus of 512 bits in width would require a data cache DCA of 512 bits in width or four banks each of 128 bits in width. Where the data bus is 128 bits wide, bit division or time division of the data bus will be required. For instance, if each vector floating-point unit seeks a 32 bit access so that the SIMD type floating-point units as a whole seek a 128 bit access in total, it will be coped with by bit division. On the other hand, if each vector floating-point unit attempts a 128 bit access, time division will be needed. Alternatively, there can be used an arrangement to define a non-operation (NOP) instruction by which one vector floating-point unit is allowed to carry out a 128 bit access but no other vector floating-point unit is allowed.

Figure 3:
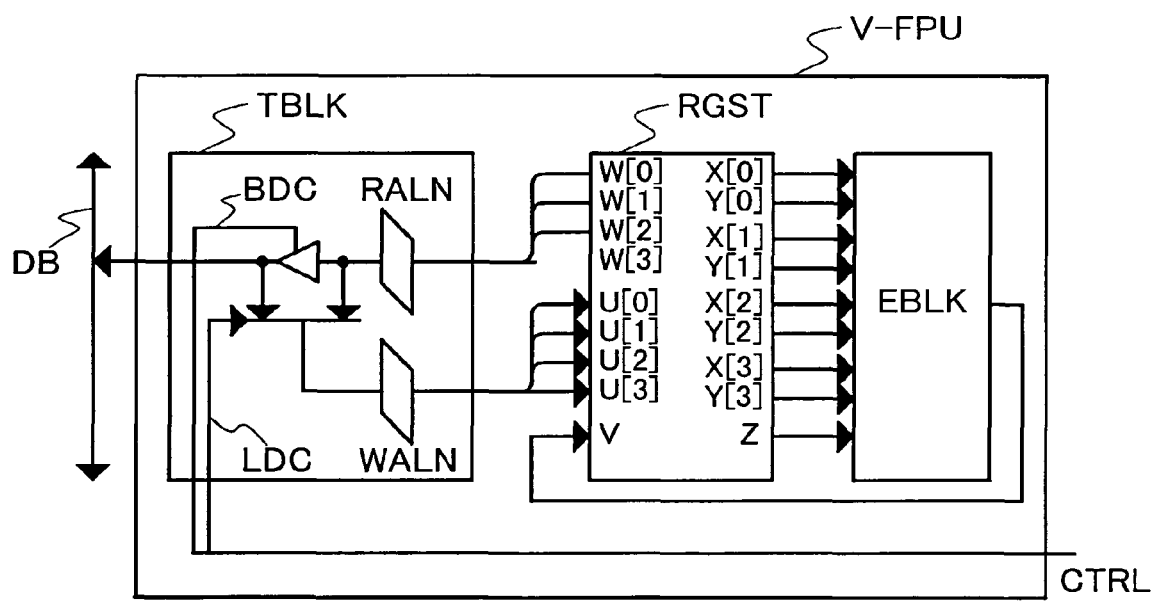
FIG. 3 illustrates the configuration of a vector FPU of the SIMD-FPU.

FIG. 3 illustrates the configuration of one of the vector floating-point units V-FPU shown in FIG. 2. When executing an instruction to do floating-point calculation, register values are transferred from two 4 bank read ports X and Y and one conventional read port Z of a 32 bit 4 bank register file RGST to an operation block EBLK to process calculation in the operation block. After the operation processing in the operation block, the result of calculation is written from an operation write port V into the register file. When executing a load instruction, a transfer block TBLK selects data which were placed on the data bus DB by a load control signal LDC and are to be loaded, and writes them into the register file via a transfer 4 bank write port U. Where the transfer width of data is less than 128 bits, a write aligner WALN appropriately aligns the data and delivers them to the U port. When executing a store instruction, the transfer block TBLK reads store data out of a transfer 4 bank read port W of the register file RGST, and transfers data read out on the basis of a bus drive signal BDC to the data bus. In this case, too, where the transfer width of data is less than 128 bits, a read aligner RALN appropriately aligns the data and delivers them to the data bus. Or when executing an inter-register transfer instruction, the transfer block reads a register value out of a read port W, selects data read out of the read port W in accordance with the load control signal LDC, and writes them into the register file from the write port U. In this case, too, where the transfer width of data is less than 128 bits, either the read aligner or the write aligner appropriately aligns the data and performs the inter-register transfer accordingly.

There are two conceivable methods to define the register: one of defining it by dividing a register file 32 bits wide into four banks by the register number, and the other of defining it by dividing a register of 128 bits in width into four in the bit direction. The advantage of the former is that a length-4 vector can be defined in a width of 32 bits, while that of the latter is that a length-4 vector can be defined with a single register. However, although the latter facilitates the processing of reading out of or writing into the register and forwarding because data, whether vector or scalar, can be accommodated by a single register, the efficiency of use and the extensibility of the register deteriorates. For instance, where an inner product instruction is defined for a register of 128 bits in width, the 96 most significant bits will be wasted because the register to store the operation output is also 128 bits in width. Or if a 128 bit width is used for defining the inner product instruction, it will become difficult to compose the inner product instruction in SIMD. For instance, four in parallel would require a 512 bit width. On the other hand, the former arrangement, as it makes possible definition of a length-4 vector inner product instruction in a 32 bit width, involves no waste of the output register, and the instruction can be easily composed in SIMD. These considerations reveal that the level of parallelism can be enhanced by defining a length-4 vector by dividing the register file into four banks by the register number and defining an inner product instruction relative to that length-4 vector, and composing the register file and the inner product instruction in SIMD, and it is made possible to enhance the level of parallelism per instruction efficiently. The former method is adopted for this embodiment of the invention.

Figure 4:
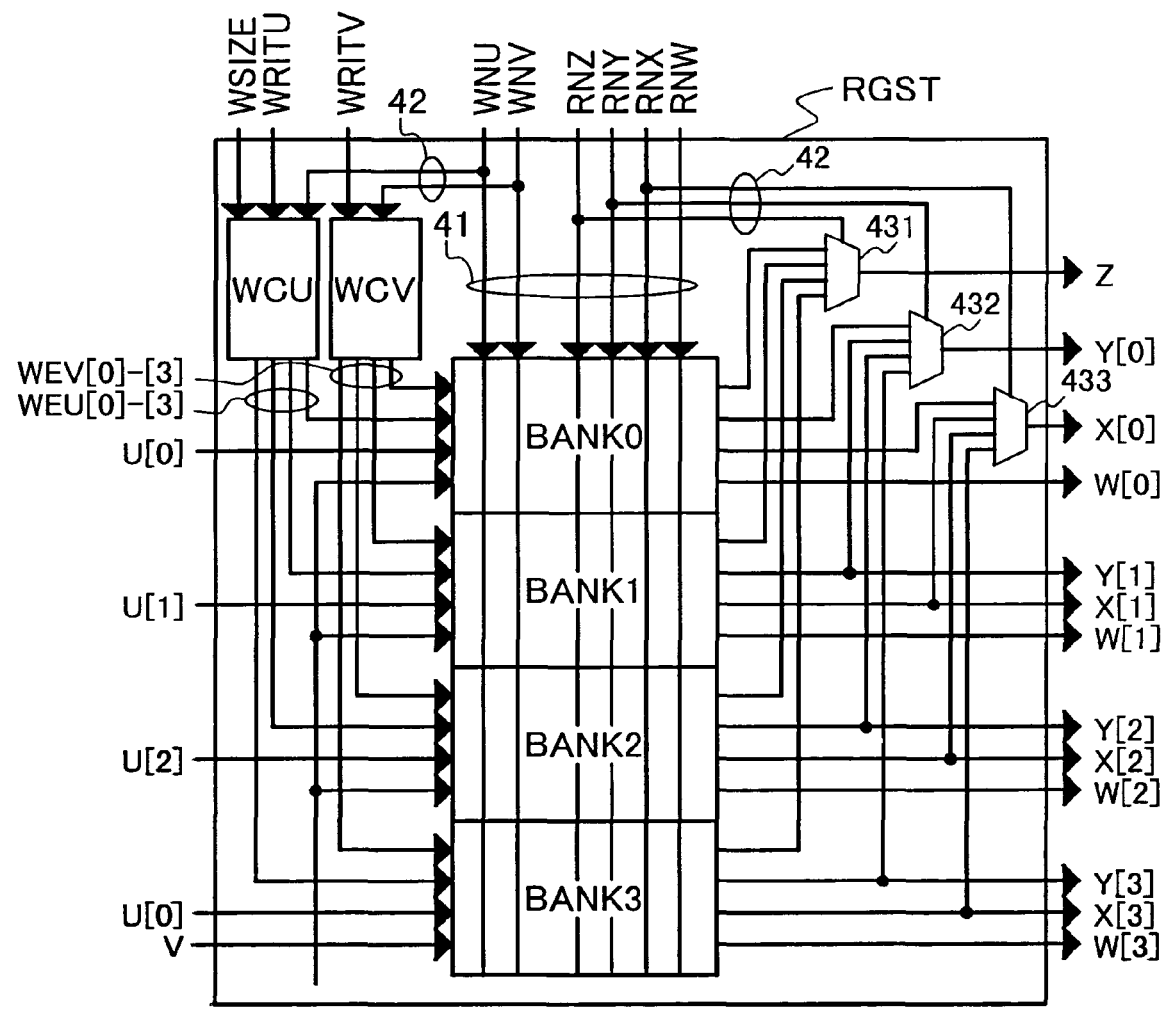
FIG. 4 illustrates the configuration of a 32 bit 4 bank register file of the vector FPU.

FIG. 4 illustrates the configuration of the 32 bit 4 bank register file RGST shown in FIG. 3. Each of the four banks BANK0, BANK1, BANK2 and BANK3 consists of sixteen 4 read 2 write and 32 bit register files. Thus the total number of registers is 4 banks×16. The register files are controlled by the four most significant bits of the register number defined by six bits, write enable signals WEU[0], WEU[1], WEU[2], WEU[3], WEV[0], WEV[1], WEV[2] and WEV[3] from WCU and WCV, which are register write control units.

The WCU, which is a register write control unit, determines the bank to be written into from the two least significant bits 42 of a write register number WNU and a write size WSIZE and, upon assertion of a write indication WRITU, asserts the write enable signal WEU of the bank to be written into. When the write size WSIZE is 128 bits, irrespective of the write register number WNU, the write enable signal of every bank is asserted. When the write size is 64 bits, the write enable signals of the banks 0 and 1 or 2 and 3 are asserted according to the write register number WNU. When the write size is 32 bits, a write enable signal for designating one of the four banks is asserted according to the write register number WNU. As a result, data are written into the register via the transfer 4 bank write port U. Where data are to be written into the register via the operation write port V, since writing into the operation write port is always in 32 bits, the register write control unit WCV, if a write indication WRITV is asserted, asserts a write enable signal WEV for designating one out of the four banks according to the two least significant bits 42 of a write register number WNV.

On each bank, one out of the sixteen 32 bit registers designated by the four most significant bits 41 of read register numbers RNW, RNX, RNY and RNZ. Since this embodiment has four banks, it is possible to read and output data out of a total of four registers. The transfer 4 bank read port W, when the transfer width is less than 128 bits, directly supplies the output of each bank because the transfer block TBLK performs alignment then. The 4 bank read ports X and Y, as does the transfer 4 bank read port, directly supply the output of each bank at the time of 128 bit outputting for vector instruction. At the time of 32 bit outputting for usual operation, the two least significant bits 42 of the register numbers RNW, RNX, RNY and RNZ are used, the bank to be read out of is selected with selectors 432 and 433, and outputting to X[0] and Y[0] is accomplished. Since the conventional read port Z is a usual 32 bit port, it always uses the two least significant bits 42 of the register numbers RNW, RNX, RNY and RNZ to select the bank to be read out of with a selector 431, and outputs data. As a result, it is made possible to mount the values of any three out of the 64 registers on X[0], Y[0] and Z.

To add, since the ports of the register file RGST in this embodiment are divided into the transfer 4 bank write port U, the transfer 4 bank read port W, the operation write port V, the 4 bank read ports X and Y, and the conventional read port Z, it is also possible to apply a superscalar or a very long instruction word (VLIW) architecture.

Figure 5:
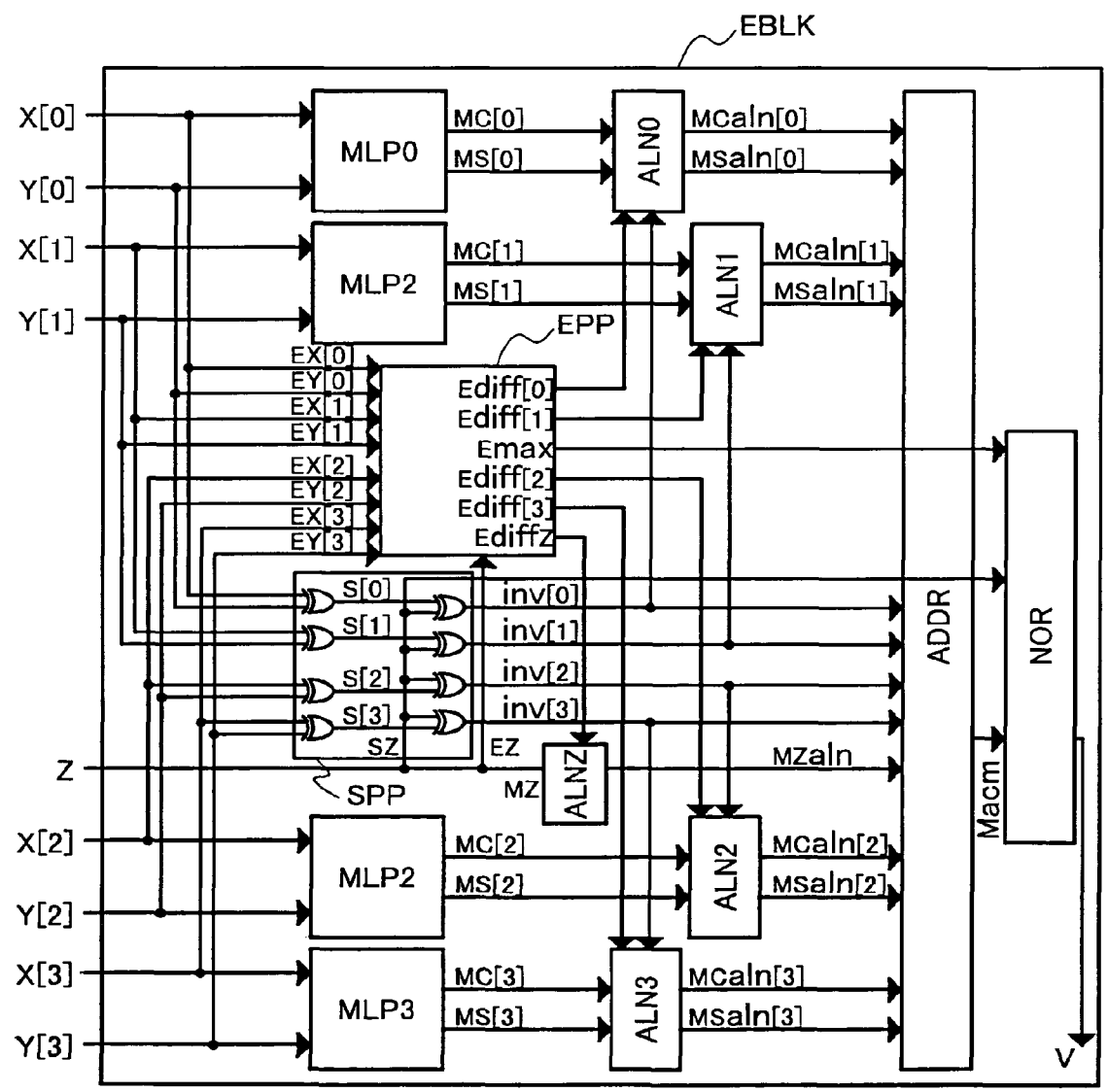
FIG. 5 illustrates the configuration of an operation block of a vector FPU.

FIG. 5 illustrates the configuration of the operation block EBLK of FIG. 3. The operation block in this embodiment calculates the sum of the inner products of floating-point length-4 vectors and a floating-point number. Thus it calculates $X[0] \times Y[0]+X[1] \times Y[1]+X[2] \times Y[2]+X[3] \times Y[3]+Z$. It consists of a sign processor SPP; an exponent processor EPP, four multipliers (MLP0, MLP1, MLP2 and MLP3), four aligners (ALN0, ALN1, ALN2 and ALN3), a Z aligner ALNZ, a 9-input adder ADDR and a normalizer NOR. The normalizer NOR processes conversion into positive numbers and rounding in addition to normalization.

Of each X or Y floating-point number that is entered, the sign is inputted to a sign processor SPP; the exponent, to an exponent processor EPP; and the mantissa, to the multipliers (MLP0, MLP1, MLP2 and MLP3).

The sign processor SPP, to which the signs X and Y are inputted, generates with an EOR gate the signs S[0], S[1], S[2] and S[3] of four X×Y products. Further, by obtaining the EORs of the results of the generation and the sign SZ of Z, it checks whether or not each of the four products has a different sign from Z, and outputs the results of checking to aligners ALN0, ALN1, ANL2 and ALN3 and the 9 input adder ADDR as Inv[0], Inv[1], Inv[2] and Inv[3]. SZ, which was referenced in checking any difference in sign, is delivered to the normalizer NOR because it is a sign before conversion into a positive number.

The exponent processor EPP finds out and delivers to the normalizer the maximum exponent Emax out of the five exponents including those of the four X×Y products and that of Z. It further calculates the differences between Emax and the exponents of these terms, and outputs them to five aligners ALN0, ALN1, ALN2, ALN3 and ALNZ as Ediff[0], Ediff[1], Ediff[2], Ediff[3] and EdiffZ. Further details will be described with reference to FIGS. 6 through 10.

To the multipliers MLP0, MLP1, MLP2 and MLP3 are inputted the respective mantissas of X and Y. The products, each of the inputted mantissa of X and that of Y, are calculated in a carry save form, and outputted as pairs of MC[0] and MS[0], MC[1] and MS[1], MC[2] and MS[2], and MC[3] and MS[3] to the respectively matching aligners ALN0, ALN1, ALN2 and ALN3. In the carry save form, addition by a carry propagate adder gives ordinary binary numbers, and this form allows fast generation because generation requires no carry propagation.

The aligners ALN0, ALN1, ALN2 and ALN3, according to an inverted sign Tnv from the sign processor SPP and an exponent difference Ediff from the exponent processor EPP, perform the alignment and logical inversion of the products of mantissas in the carry save form outputted from the multiplier MLP0, MLP1, MLP2 and MLP3. The outputs of the aligners are delivered to the 9 input adder ADDR as pairs of MCaln[0] and MSaln[0], MCaln[1] and MSaln[1], MCaln[2] and MSaln[2], and MCaln[3] and MSaln[3]. Details will be described with reference to FIG. 10. A Z aligner, according to an exponent difference EdifffZ from the exponent processor, aligns the mantissa MZ of Z, and delivers it as Mzaln to the 9 input adder. Details will be described with reference to FIG. 11.

Figure 14:
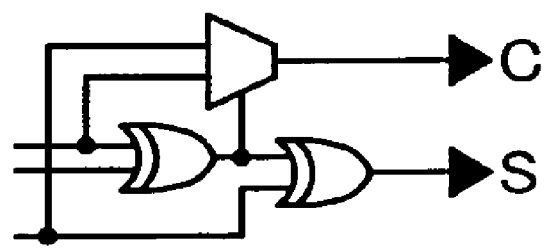
FIG. 14 illustrates an example of 1 bit 3 input adder.

The 9 input adder adds MCaln[0], MSaln[0], MCaln[1], MSaln[1], Mcaln[2], Msaln[2], MCaln[3], MSaln[3] and Mzaln, and delivers the sum to the normalizer as Macm. Whereas the four aligners ALN0, ALN1, ALN2 and ALN3 subject four pairs in the carry save form to logical inversion because terms of different signs are added, +1 would be further needed for negation. Since +1 is accomplished by carrying into the 9 input adder, the frequency of carry-in is controlled by inputting Inv[0], Inv[1], Inv[2] and Inv[3]. Details will be described with reference to FIGS. 12 and 14.

The normalizer NOR receives SZ from a sign generator, Emax from the exponent processor and Macm from the 9 input adder, performs normalization, conversion into positive numbers and rounding as does an ordinary floating-point execution unit, and delivers to the register file RGST the final result of operations so generated.

Figure 6:
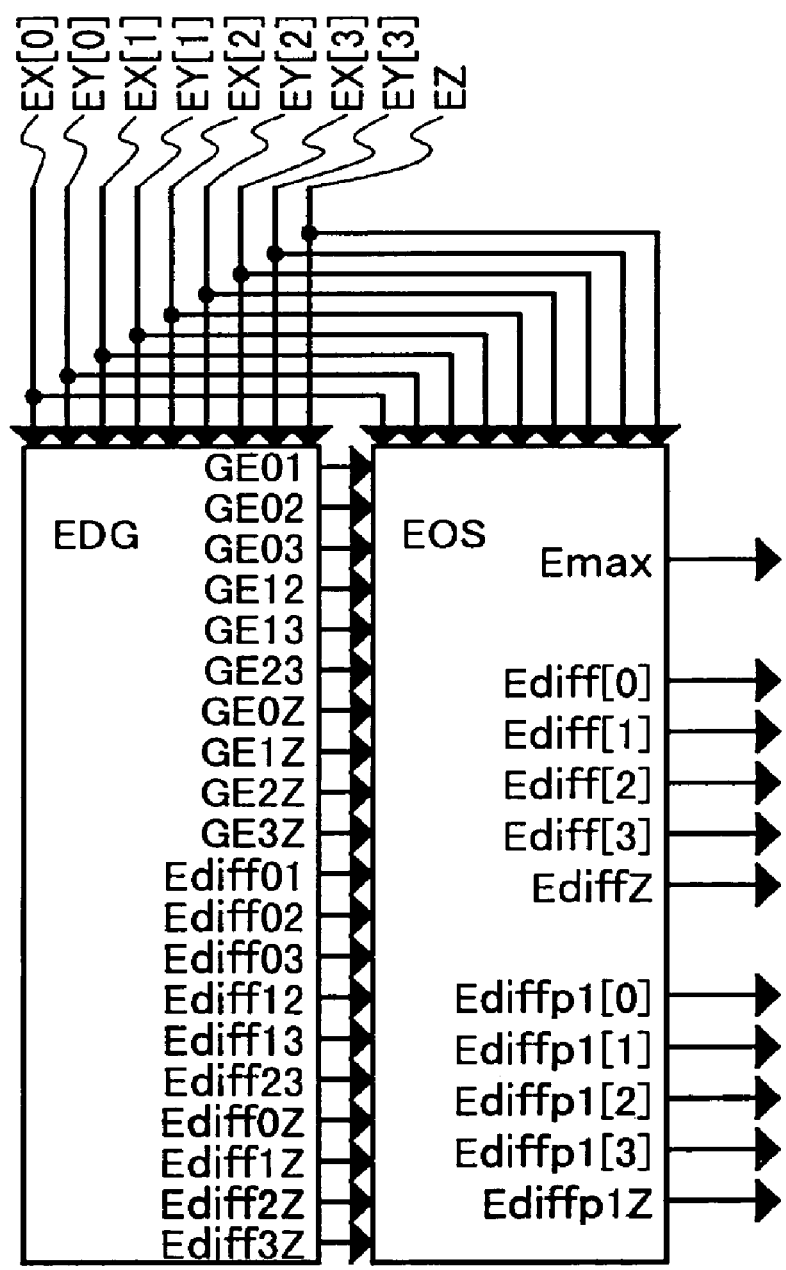
FIG. 6 illustrates an exponent processor of the operation block.

FIG. 6 illustrates the exponent processor EPP. In this example, the exponent difference is directly calculated with a 4 input adder to achieve high speed. A generally conceivable technique is to figure out the exponents of the four products, find out the greatest of these and the exponent of Z, and to determine the differences between the individual exponents and the maximum exponent, but this, besides being slow, would require four adders, four to 10 magnitude comparators (differing with the level of parallelism of comparison) and five subtractors, resulting in no reduction in logical dimensions. The exponent processor in this embodiment, as shown in FIG. 6, consists of an exponent difference generator EDG and an output selector EOS.

Figure 7:
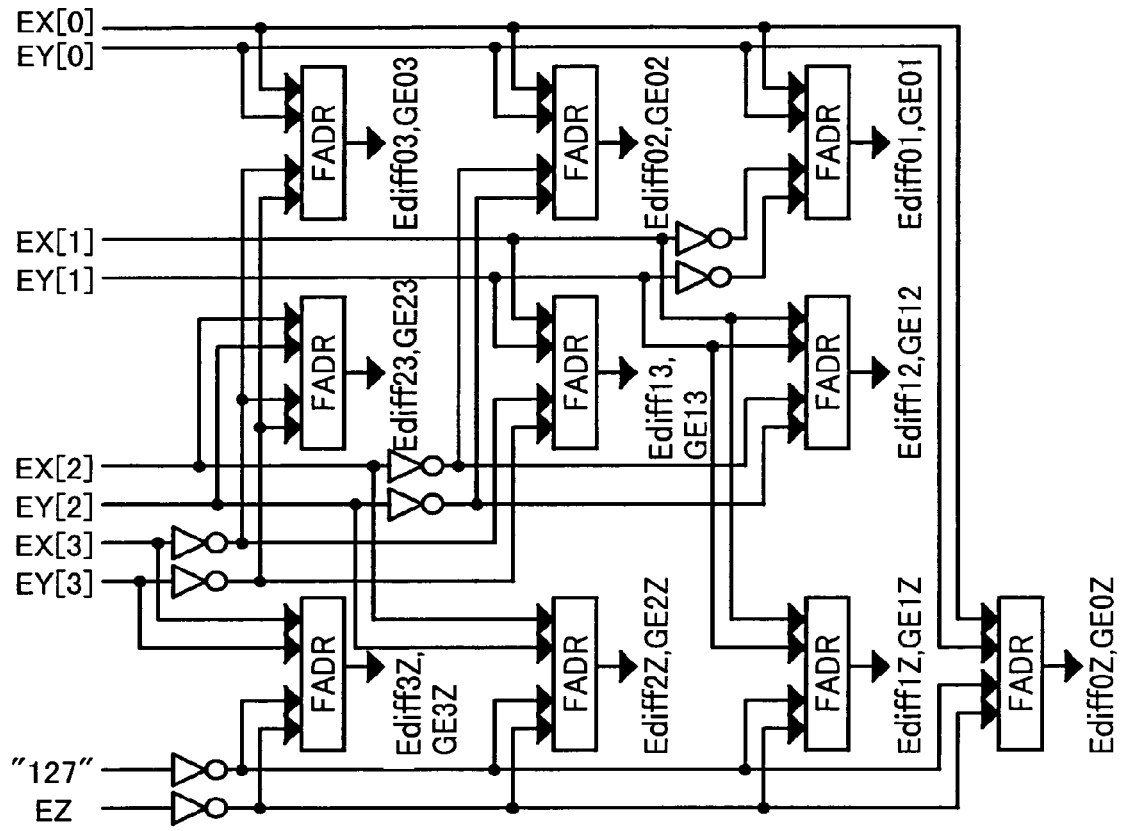
FIG. 7 illustrates an exponent difference generator of the exponent processor.

FIG. 7 illustrates the configuration of the exponent difference generator EDG. It calculates with ten 4 input adders FADR the exponent difference between every pair of terms that can be selected out of five terms. For instance, the exponent difference between X[0]×Y[0] and X[1]×Y[1] is EX[0]+EY[0]−EX[1]−EY[1]. Every exponent is biased with "127" based on a standard. However, as four biases cancel each other in the above-cited formula, the bias of any exponent difference calculated by this formula is "0". On the other hand, the exponent difference between X[3]×Y[3] and Z is EX[3]+EY[3]−EZ−127. The subtraction of 128 is to cancel the bias.

Figure 8:
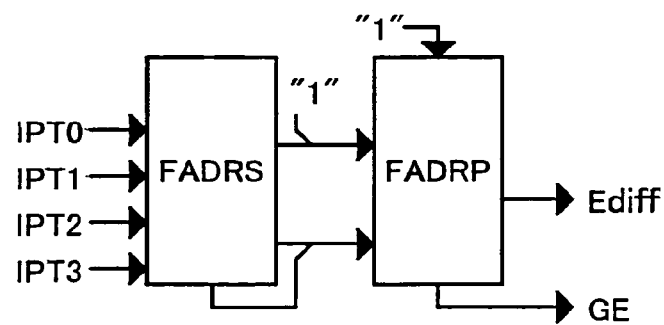
FIG. 8 illustrates a 4 input adder of the exponent difference generator.
Figure 15:
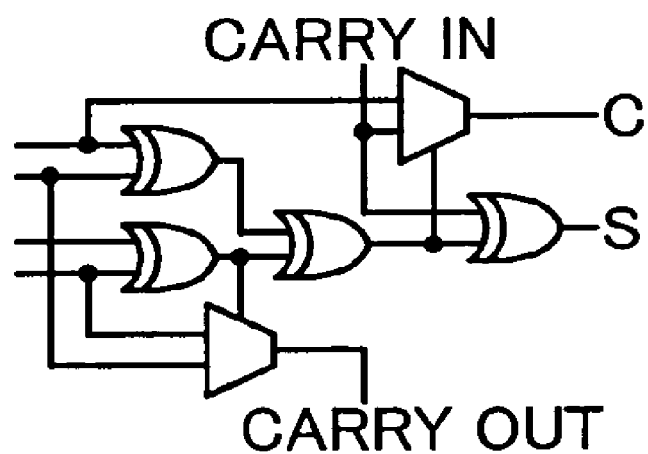
FIG. 15 illustrates an example of 1 bit 4 input adder.

FIG. 8 illustrates the 4 input adder FADR of FIG. 7. It consists of an 8 bit 4 input carry save adder FADRS, into which four inputs IPT0, IPT1, IPT2 and IPT3 are entered, and a 9 bit carry propagate adder FADRP. In FIG. 7, as only two out of four terms are subjected to logical inversion, there is a 2 bit carry-in for the negation of these two terms. To express the range of exponent differences in −510 through 510, 10 bits of binary numbers with signs are needed, and therefore it is simple to extend the signs of inputs to 10 bits and perform calculation in a 10 bit width. However, since the more significant bits are redundant in practice, the configuration shown in FIG. 8 is used. In the configuration of this embodiment, the carry-out from the 9 bit carry propagate adder FADRP is 1 when the result of 4 input addition is positive. Therefore, the carry-out indicates that either the exponent not negated is greater or the two exponents are equal. This carry-out is outputted as a GE signal and used for judging the relative magnitudes of exponents. Incidentally, the 8 bit 4 input carry save adder is configured by arranging 1 bit 4 input carry save adders as illustrated in FIG. 15.

Figure 9:
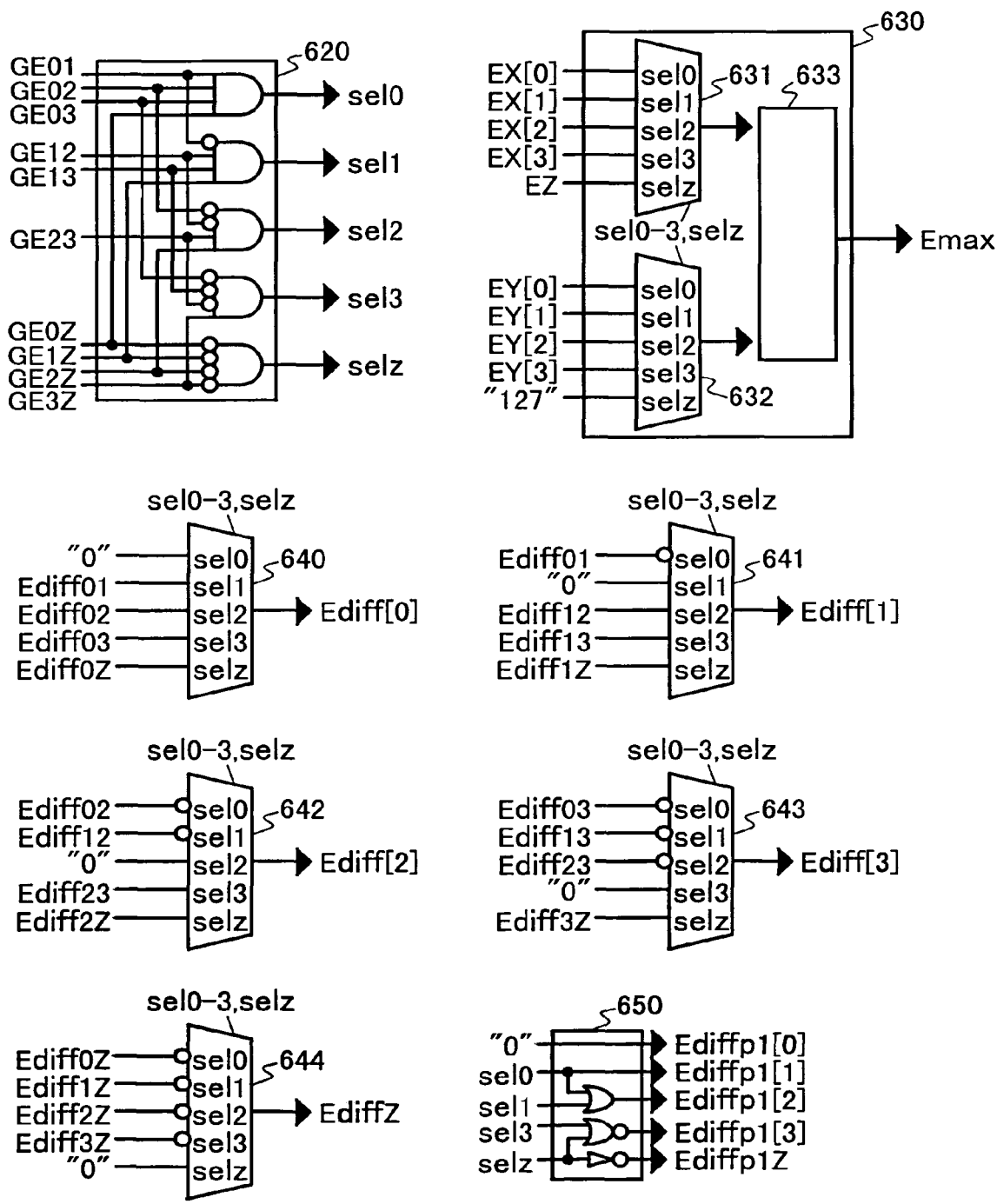
FIG. 9 illustrates an output selector of the exponent processor.
Figure 10:
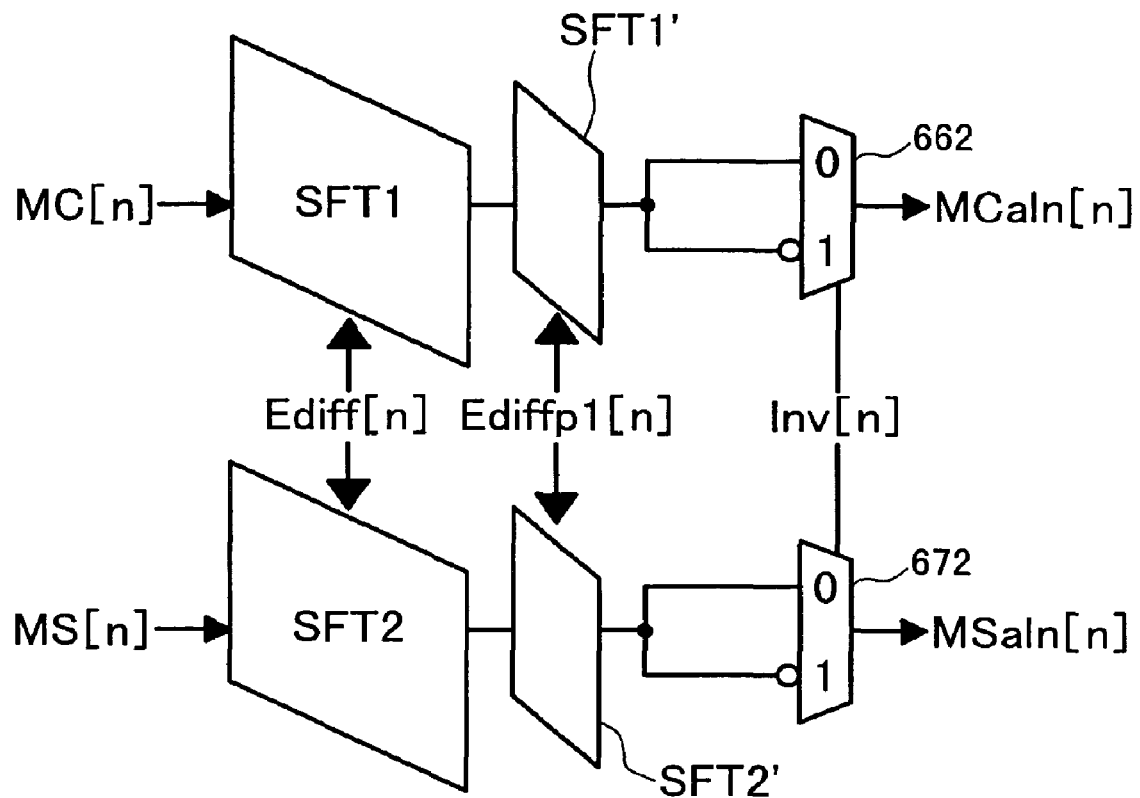
FIG. 10 illustrates an aligner of the operation block.

FIG. 9 illustrates details of the output selector EOS of FIG. 6. First in 620, on the basis of 10 GE signals (GE01, GE02, GE03, GE12, GE13, GE0Z, GE1Z, GE2Z and GE3Z) outputted from the exponent difference generator EDG, selection control signals se10, se11, se12, se13 and se1z are generated. The signals se10, se11, se12, se13 and se1z respectively show that X[0]×Y[0], X[1]×Y[1], X[2]×Y[2], X[3]×Y[3] and Z have the maximum exponent, though where the exponents are equal there is priority in this order, assuring that the selection control signal be a one hot. For instance, if all the exponents are equal, only se10 is asserted. Next in 630, on the basis of the selection control signals generated as described above, the maximum exponent Emax is generated. As the exponent differences were directly generated with the 4 input adder FADR, the maximum exponent is generated anew in 630. As illustrated, in 631 and 632, exponents are selected with selection control signals, and added with the 8 bit carry propagate adder 633. Incidentally, where EZ is selected, EZ+127 is calculated to match the bias with others. Next, in 640 through 644, the exponent differences Ediff[0], Ediff[1], Ediff[2], Ediff[3] and EdiffZ of the terms are figured out. Since the exponent differences are calculated before determining Emax, the exponent difference is not "Emax—the exponent of the pertinent term", necessitating negation in some cases. For this reason, some of the exponent differences outputted from the exponent difference generator EDG are subjected to logical inversion before they are inputted to selectors. Further, where a given exponent itself is the maximum exponent, the exponent difference is "0" and therefore "0" is inputted. Also, in order to complete negation, it is necessary to add 1 after logical inversion Then, signals Ediffp1[0], Ediffp1[1], Ediffp1[2], Ediffp1[3] and Ediffp1Z indicating the necessity of 1 are figured out with 650. Incidentally in this embodiment, 1 is not added for any exponent difference, but where +1 is needed, shifting is done by 1 bit instead of adding 1 in the aligner using the exponent difference The aligners ALN0, ALN1, ALN2 and ALN3 in FIG. 10 will now be described. The aligners in this embodiment are aligners for four products in the carry save form. There are two aligners each for the carry side MC [n] (n may be any number from 0 through 3) and for the sum side MS [n], and are controlled with the same signal. First, shifting toward the right by an exponent difference Ediff[n] is accomplished with shifters SFT1 and SFT2. Next, where Ediffp1[n] is 1, 1 bit shifters SFT1' and SFT2' perform shifting by another 1 bit. Then in 662 and 672, where Inv[n] is 1, logical inversion is carried out In this arrangement, MCaln[n] is outputted for MC[n], and MSaln[n], for MS[n].

Figure 11:
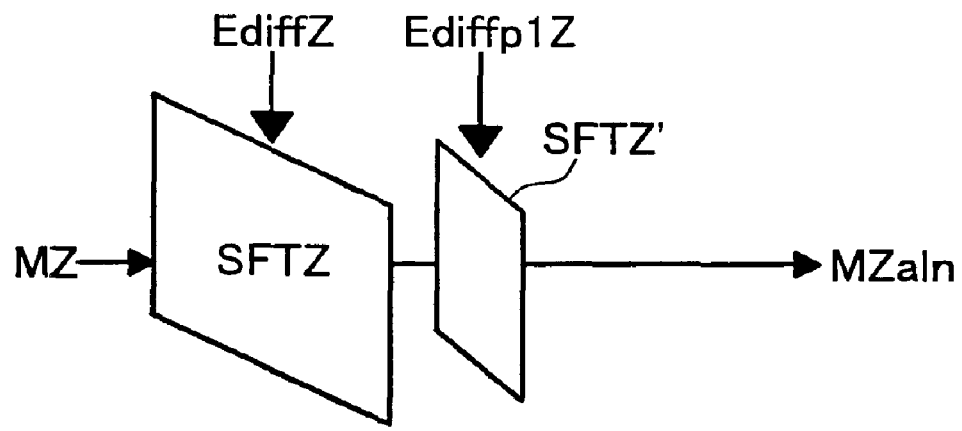
FIG. 11 illustrates a Z aligner of the operation block.

FIG. 11 illustrates the Z aligner ALNZ. First, MZ inputted to the shifter SFTZ is shifted to the right by the exponent difference EdiffZ Next, where Ediffp1Z is 1 in the 1 bit shifter SFTZ', it is shifted by another 1 bit, and the result is outputted as Mza1n. To add, since sign difference decision is done with reference to Z, Z needs no negation.

Figure 12:
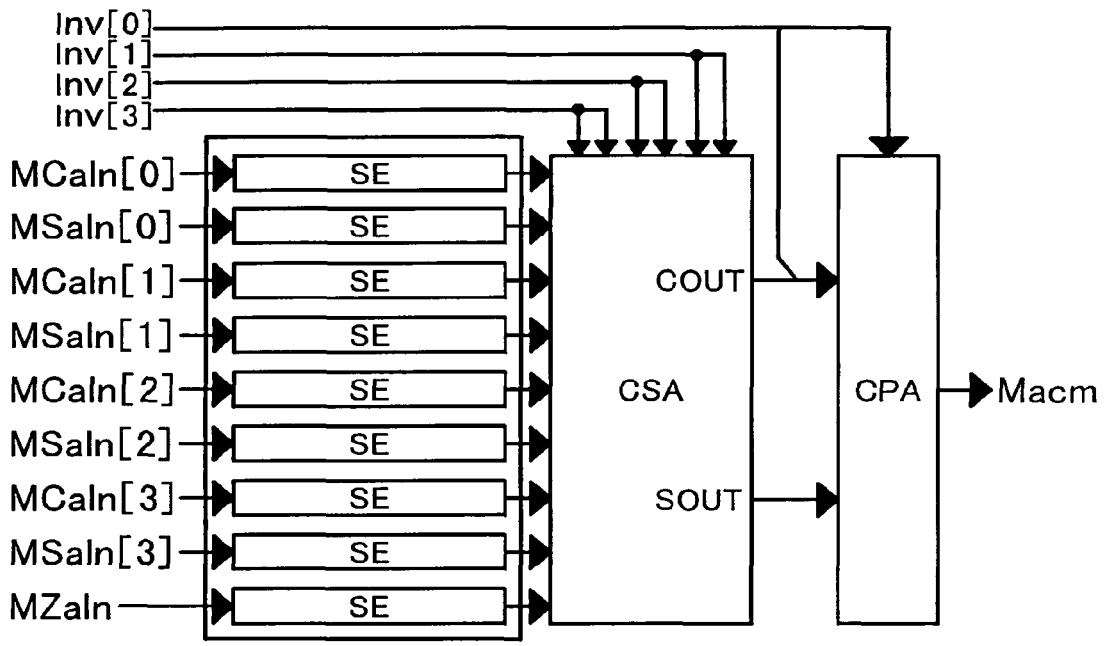
FIG. 12 illustrates a 9 input adder of the operation block.

With reference to FIG. 12, the 9 input adder ADDR shown in FIG. 5 will now be described in detail. In this embodiment, in spite of the 9 input addition arrangement, the increase in the number of digits is at most three bits because the carry save form increases five inputs to the nine inputs. First, each of the nine inputs supplied by the aligners ALN0, ALN1, ALN2, ALN3 and ALNZ are extended by three bit signs by a sign extender SE. The output of the sign extender is inputted to a 9 input carry save adder array CSA. Then, carry-in is accomplished according to the number of terms negated. As two bits are carried in to invert one pair of products in the carry save form, a maximum of eight bits should be carried in for four products. Since negation is controlled with Inv[0], Inv[1], Inv[2] and Inv[3], a 2 bit carry is matched with each of these four signals as illustrated, 6 bit and 2 bit carries-in are performed on the 9 input carry save adder array CSA and the carry propagate adder CPA, respectively. The carry propagate adder generates a pre-normalization mantissa Macm from the aforementioned 2 bit carries, and a carry output COUT and a sum output SOUT from the 9 input carry save adder array.

Figure 13:
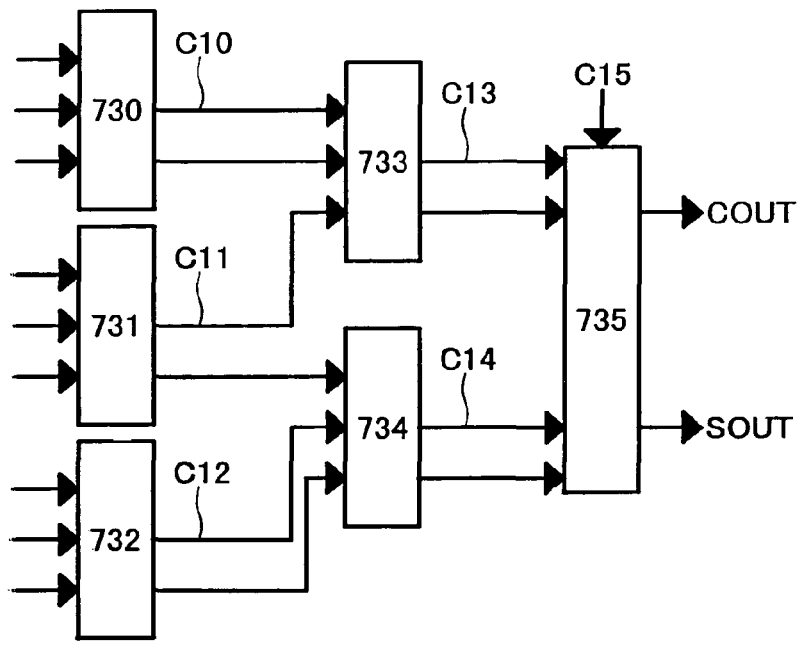
FIG. 13 illustrates a 9 input carry save adder array of the 9 input adder.

FIG. 13 illustrates in detail the 9 input carry save adder array CSA shown in FIG. 12. From the left side in FIG. 13, the output of the 3 bit sign extender is inputted. Therein the first stage consists of 3 input carry save adders 730, 731 and 732, the second stage, also of 3 input carry save adders 733 and 734, and the third stage of a 4 input carry save adder 735. This configuration serves to reduce the number of terms from 9 to 6, 4 and then 2 and finally to provide the carry output COUT and the sum output SOUT. In this embodiment, carry-in is possible up to six bits of CI0, CI1, CI2, CI3, CI4 and CI5. To add, the 3 input carry save adder is composed by arranging as many 1 bit 3 input carry save adders, such as the one shown in FIG. 14 for instance, as matching the bit width. Further, the 4 input carry save adder is composed of 1 bit 4 input carry save adders, such as the one shown in FIG. 15.

Figure 16:
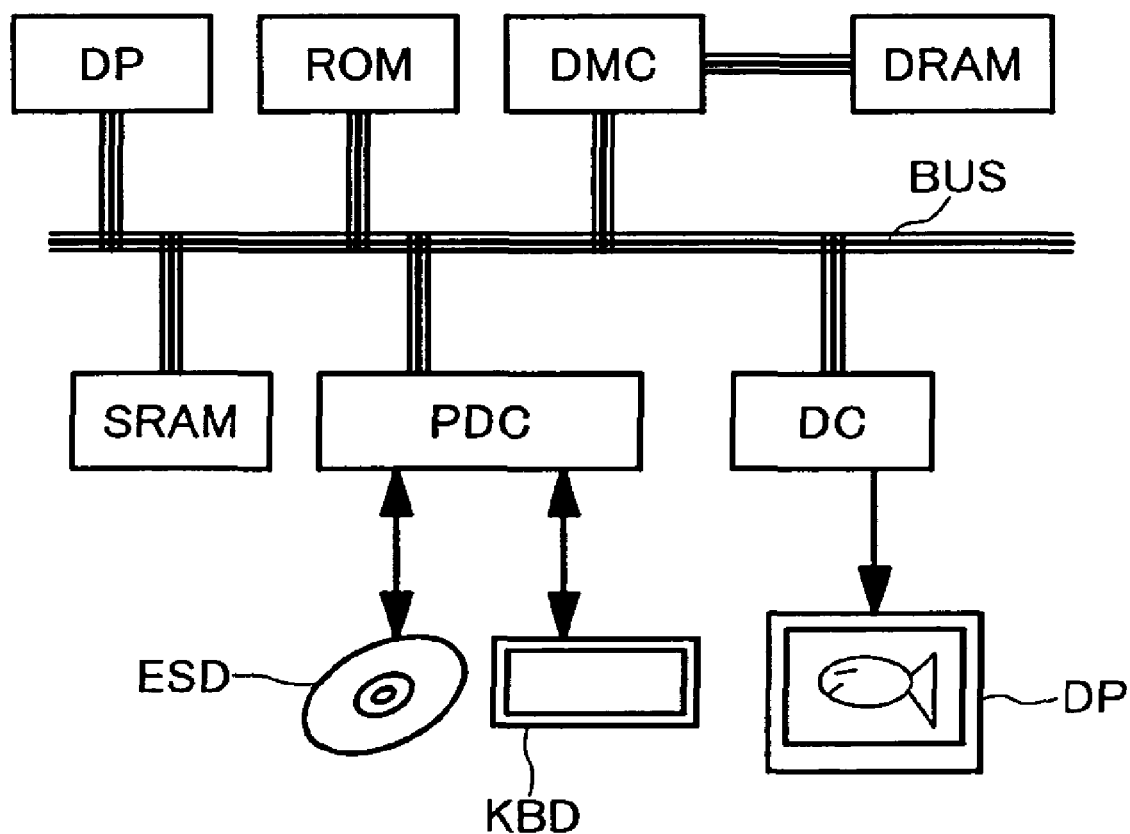
FIG. 16 illustrates a data processing system using a data processor according to the invention.

FIG. 16 is a block diagram illustrating a data processing system, which is another preferred embodiment of the present invention. Referring to FIG. 16, the above-described data processor DP is connected to a bus BUS. The bus shown here is supposed to include a bus over which addresses are transferred and another bus over which data are transferred. There is no limitation to the bus width or the like. Furthermore, both a configuration in which instructions and data are transferred over the same bus and another configuration in which instructions and data are transferred over separate buses are covered by the concept of bus shown in this diagram. The bus configuration can be varied in many different ways according to the processing speed, area efficiency or the configuration of any device to be connected in the data processing system.

To the aforementioned bus BUS are connected an SRAM to be used as the working area of the data processor or an area for temporary storage of data, and a ROM on which the operating system (OS) of the data processor and the like are stored. A DRAM is also connected to the bus via a control circuit DMC. The control circuit DMC, which is to perform address multiplex control and refresh control over the DRAM, may have a configuration in which its functions are distributed within the DRAM or within the data processor. Further, a peripheral device control unit PDC and a display controller DC are connected to the bus To the peripheral device control unit are connected an external storage device ESD, such as an optical disk, a keyboard KBD and the like. A display unit DP is connected to the display controller.

The above-described data processor, as it is provided with instructions for executing floating-point operations and has registers for floating-point operations to transfer instructions, can execute at high speed floating-point number operations which are frequently used in three dimensional graphic processing. Therefore the data processing system embodying the invention as described above to be used as a game machine, a portable information terminal or the like, which are items of multimedia equipment, makes possible three dimensional graphic processing with high precision and at high speed while reducing the overall cost.

It is further possible, in the data processing system of FIG. 16, to add a rendering coprocessor to the bus BUS. Three dimensional graphic processing consists of geometric processing and rendering. Geometry, which uses many inner product operations and vector converting operations, is let be processed by the data processor DP embodying the invention as described above, while rendering is left to the rendering coprocessor. This disposition makes it possible to provide a data processing system capable of accomplishing three dimensional graphic processing faster than a data processing system which causes rendering to be processed by a central processing unit within its data processor.

Although the invention accomplished by the present inventor has been described in detail with reference to preferred embodiments thereof, it goes without saying that the invention is not limited to the embodiments described so far, but variations are conceivable without deviating from its true spirit and scope.

For instance, the data processor can include some other block or blocks, such as a memory management unit, than the blocks contained in these embodiments, and it is also possible to alter the arrangement and the like of the blocks contained in these embodiments. Also, the data processor may use superscalar architecture. By using superscalar architecture, it is made possible to cause one pipe to execute an operation processing instruction and another pipe to load data from a memory or store data into a memory, which would contribute to faster processing.

Further with reference to these embodiments, FPUs formed in the data processor have been described. However, the idea underlying the invention is not restricted to the FPU, but can as well be applied to the integer operating unit. When applying it to the integer operating unit, if the multiplier array and the 9 input adder of FIG. 5 are used, it will be made possible to implement with an execution unit the summing of integer type inner products of length-4 vectors and scalars. Although the integer type execution unit would not be able to contribute so much to reducing the logical dimensions of the execution unit as does a pure 16 parallel SIMD system, it would make possible achievement of an equal level of operation parallelism with a 4 parallel SIMD system, i.e. only ¼ in size. Furthermore, since the register width could also be reduced to ¼, it would be made possible to substantially reduce the logical dimensions of registers The configuration and operations of the invention disclosed in the present application can provide the above-noted and following advantages.

The data processor and the data processing system according to the invention can let their instruction set have an instruction to cause the SIMD-FPU mounted on the data processor of FIG. 1 to process four inner products of length-4 vectors in the floating-point form. The above-described configuration and the presence of this instruction make possible 28 floating-point operations in a single cycle where the instruction is to be executed in one cycle.

The configuration further enables each execution unit of the SIMD-FPU to add the inner product of length-4 vectors and scalar data and, by including in the instruction set of the data processor an instruction of inner product and addition, enables hypercomplex vector data to be handed as well.

By combining as described above the inner product and addition processing by the execution unit and the composition of the execution unit compatible with SIMD, and including a corresponding instruction in the instruction set, it is made possible to execute 32 floating-point operations in a single cycle where the instruction is to be executed in one cycle.

The above-described data processor and the data processing system whose configuration uses the data processor can substantially enhance the level of operation parallelism and the processing speed compared with conventional data processors and data processing systems. The data processor has a processing capability of 32 FLOPS per cycle.

Furthermore, as illustrated in FIG. 5, the operation block according to the invention is so configured as to perform carry propagation addition only once for mantissa processing and the calculation of the exponent difference between the maximum exponent term and each term. As a result, it is easy to shorten operation latency, making the configuration suitable for high-frequency operation.

By composing the instruction to multiply length-4 vectors in SIMD of four in parallel according to the invention, it is made possible to execute 28 operations at a single instruction. Furthermore, by defining the processing to add the inner product of length-4 vectors and scalars, it is made possible to handle hypercomplex vector data of over length-4, and to execute 32 operations at a single instruction. Therefore, it is made possible to provide a data processor capable of processing the operation of floating-point numbers at high speed and, in addition, to provide a data processing system capable of multimedia processing, in particular three dimensional graphic processing at high speed.

The present invention is not limited to the above embodiments and various changes and modifications can be made within the spirit and scope of the present invention. Therefore, to appraise the public of the scope of the present invention, the following claims are made.

What is claimed is:

1. A data processor for executing instructions in an instruction set, the data processor comprising:
a calculation unit,
wherein said instruction set includes an instruction for causing said data processor to calculate a product of matrix data and vector data, and
wherein the calculation unit is constructed to calculate the product of matrix data and vector data with a single execution of said instruction, and
wherein said calculation unit includes a plurality of floating-point execution units for calculating an inner product of a vector and another vector.

2. A data processor according to claim 1, wherein:
said matrix data are 4×4 matrix data and said vector data are length-4 vectors.

3. A data processor according to claim 1, wherein:
each of said plurality of floating-point execution units is an execution unit capable of calculating a sum of inner product and scalar data.

4. A data processor according to claim 3, wherein:
said execution unit includes a 9-input adder.

5. A data processor according to claim 4, wherein:
each said floating-point execution unit includes a plurality of multiplier circuits connected to the 9-input adder of that floating-point execution unit.

* * * * *